United States Patent [19]
Suzuki et al.

[11] Patent Number: 5,329,913
[45] Date of Patent: Jul. 19, 1994

[54] OIL VAPOR SEPARATOR SYSTEM FOR THE ENGINE OF A GAS HEAT PUMP AIR CONDITIONER

[75] Inventors: Shigeto Suzuki; Makoto Oguri; Toshinori Fukudome, all of Iwata, Japan

[73] Assignee: Yamaha Hatsudoki Kabushiki Kaisha, Iwata, Japan

[21] Appl. No.: 857,777

[22] Filed: Mar. 26, 1992

[30] Foreign Application Priority Data

Mar. 26, 1991 [JP] Japan ................................ 3-087802

[51] Int. Cl.⁵ ............................................. F02B 25/06
[52] U.S. Cl. ................................ 123/573; 123/198 E
[58] Field of Search .................... 123/572, 573, 41.12, 123/142.5 E, 198 E

[56] References Cited

U.S. PATENT DOCUMENTS 5,007,383 4/1991 Ito et al. ........................ 123/198 E 5,024,203 6/1991 Hill ..................................... 123/573

FOREIGN PATENT DOCUMENTS 2455174 12/1980 France ............................. 123/41.12

*Primary Examiner*—Noah P. Kamen
*Attorney, Agent, or Firm*—Knobbe, Martens, Olson & Bear

[57] ABSTRACT

A number of embodiments of crankcase ventilating systems for gas powered internal combustion engines employed in heat pumps. The crankcase ventilating system includes an oil vapor separator for separating and condensing oil from the crankcase ventilating gases and returning water vapor and the crankcase ventilating gases to the engine induction system for further combustion and purification. A number of various arrangements for controlling the temperature of the oil vapor separator are disclosed and an embodiment is disclosed that employs a pair of oil vapor separators acting in series.

6 Claims, 12 Drawing Sheets

OIL VAPOR SEPARATOR SYSTEM FOR THE ENGINE OF A GAS HEAT PUMP AIR CONDITIONER

BACKGROUND OF THE INVENTION

This invention relates to a gas heat pump air conditioner and more particularly to an improved powering internal combustion engine and crankcase ventilating system for such an engine.

As is well known, internal combustion engines are employed for providing, power in a variety of applications. One proposed application for internal combustion engines is to employ them as a powering source for driving a compressor of a gas heat pump. In such applications, the internal combustion engine itself is powered by a gaseous fuel. Internal combustion engines have great utility in such applications because of their efficiency.

However in an application of this type for internal combustion engines, the engine may be called upon to run for long periods of time without servicing. When this is done, it is extremely important to insure that the crankcase and lubricating system for the engine is adequately ventilated, that contaminates are removed from the lubricating oil and that in doing so the oil itself does not become further contaminated.

That is, it is well known to provide a system wherein there is a flow of ventilating gas through the crankcase and lubricating system of the engine. Such ventilating systems have been found to substantially reduce the deterioration of the lubricant. However, for emission control it is desirable to insure that the crankcase ventilating gases are not discharged directly to the atmosphere. The reason for this is that they may contain a fairly high percentage of unwanted constituents, such as hydrocarbons resulting from blowby during engine operation.

It has, therefore, been the practice to return the crankcase ventilating gases to the engine induction system so that any unburned hydrocarbons can be further oxidized and consumed in the combustion chamber without being discharged directly to the atmosphere.

FIG. 1 is a cross sectional view of a conventional type of prior art internal combustion engine having a conventional type of crankcase lubricating system of the type aforedescribed. In this figure, the conventional engine is identified generally by the reference numeral 21 and is shown in a cross sectional view taken through its single cylinder. The engine 21 includes a cylinder block 22 in which a cylinder bore 23 is formed. A piston 24 reciprocates in this cylinder bore 23 and is connected by means of a piston pin 25 to the upper or small end of a connecting rod 26.

The connecting rod 26 has its lower or big end 27 journaled on a throw 28 of a crankshaft that is rotatably journaled within a crankcase chamber 29. The crankcase chamber 29 is formed by a skirt 31 of the cylinder block 22 and a oil pan 32 that is affixed to the skirt 31 in any suitable manner. A lubricant, such as oil is contained at a level shown by the dot/dash line 33 in the oil pan 32 for lubrication of the engine 21 through any suitable and well known type of lubricating system.

A cylinder head assembly, indicated generally by the reference numeral 34 is affixed to the cylinder block 22 in a known manner and has a lower recess 35 which defines, in part, the combustion chamber of the engine 21 along with the head of the piston 24 and cylinder bore 23. An intake charge is delivered to the combustion chamber 35 through an intake port 36 having an intake valve (not shown) that controls the communication of the intake port 36 with the combustion chamber 35. In a like manner, an exhaust passage 37 connects the combustion chamber 35 with the atmosphere through an exhaust system (not shown). An exhaust valve (not shown) controls the communication of the combustion chamber 35 with the exhaust passage 37. The intake and exhaust valves and their operating system have not been shown because they are well known in the art and the descriptive matter relates to the crankcase ventilation system, which is the area where the invention resides.

An air charge for the intake passage 36 is drawn from the atmosphere through an air inlet device, indicated generally by the reference numeral 38 which has an inlet opening 39. The air inlet device 38 has a discharge opening 41 with a filter element 42 being disposed between the inlet opening 39 and the outlet opening 41 for filtering the atmospheric air that is drawn for the induction system. A manifold and induction system 43 connects the air inlet device outlet 41 with the intake passage 36 of the cylinder head. A throttle valve assembly 44 is provided in the induction system 43 for controlling the speed of the engine 21 in a well known manner. A source of gaseous fuel is supplied to the engine at an appropriate position in the induction system 43.

As has been noted, it is desirable to provide a source of ventilating air for the lubricating system and particularly so as to ventilate the crankcase chamber 29. These ventilating gases in the conventional prior art type of construction are derived from the atmosphere but are generated by the blowby gases flowing past the piston 24 in the manner as shown by the dot/dash arrows in the figure. These gases then pass across the upper surface of the lubricant 33 and through an internal separator 45 formed in the skirt portion 31 of the cylinder block 22 so as to entrap larger lubricant particles and cause them to be delivered back to the crankcase chamber 29. These lubricating gases that had a coarse separation accomplished then pass through a vertically extending passage 46 formed at one side of the cylinder bore 23 and exit through a discharge fitting 47.

A flexible conduit 48 connects this discharge fitting 47 with the air intake device 38 downstream of the filter element 42. A further filter element 49 is provided in the air inlet device 38 for filtering the crankcase ventilating gases before they pass through the air inlet device outlet 41 for flow back into the engine through the induction system 43. The separator 49 will tend to remove larger particles of liquid such as lubricant and/or water vapor. As is well known, water vapor is generated by the combustion process in the engine and hence there will be a fairly large amount of water vapor in the crankcase ventilation gases.

Since the filter 49 is provided in the air inlet device 38, the air inlet device 38 and filter element 49 will operate at a considerably lower temperature than the temperature of the ventilating gases. As a result, water vapor tends to condense out into the filter element 49 and can flow back through the conduit 48 to the crankcase chamber 33 to cause dilution of the lubricant therein and other problems. In addition, there is the problem that condensation can actually form directly in the filter element 49 and may clog the filter element 49. Hence, the prior art constructions as described have these disadvantages each of which will reduce the quality of the lubricant in the crankcase chamber during long periods between servicing.

It is, therefore, a principal object of this invention to provide an improved lubricating and crankcase ventilating system for an internal combustion engine.

It is a further object of this invention to provide an improved crankcase ventilating system for an internal combustion engine that will provide extremely long service intervals for changing of the lubricant in the engine.

It is a further object of this invention to provide an improved lubricating and crankcase ventilating system for an internal combustion engine wherein water vapor can be easily extracted from the lubricant and the gases that flow through the crankcase chamber while oil will be condensed and reconveyed to the crankcase chamber.

It is a yet further object of this invention to provide an improved crankcase ventilating system for the gas powered internal combustion engine of a heat pump.

SUMMARY OF THE INVENTION

This invention is adapted to be embodied in an internal combustion engine having a crankcase and a crankcase ventilating system and contained within a housing having an air inlet and an air discharge through which cooling air is circulated. An oil, vapor separator is contained within the housing. Conduit means deliver gases from the crankcase ventilating system to the oil, vapor separator. Return conduit means return condensed oil from the oil, vapor separator to the crankcase, and vent means discharge the remaining ventilation gases from the oil vapor separator to the engine for combustion in a combustion chamber therein.

DETAILED DESCRIPTION OF THE PREFERRED EMBODIMENT OF THE INVENTION

Figure 1:
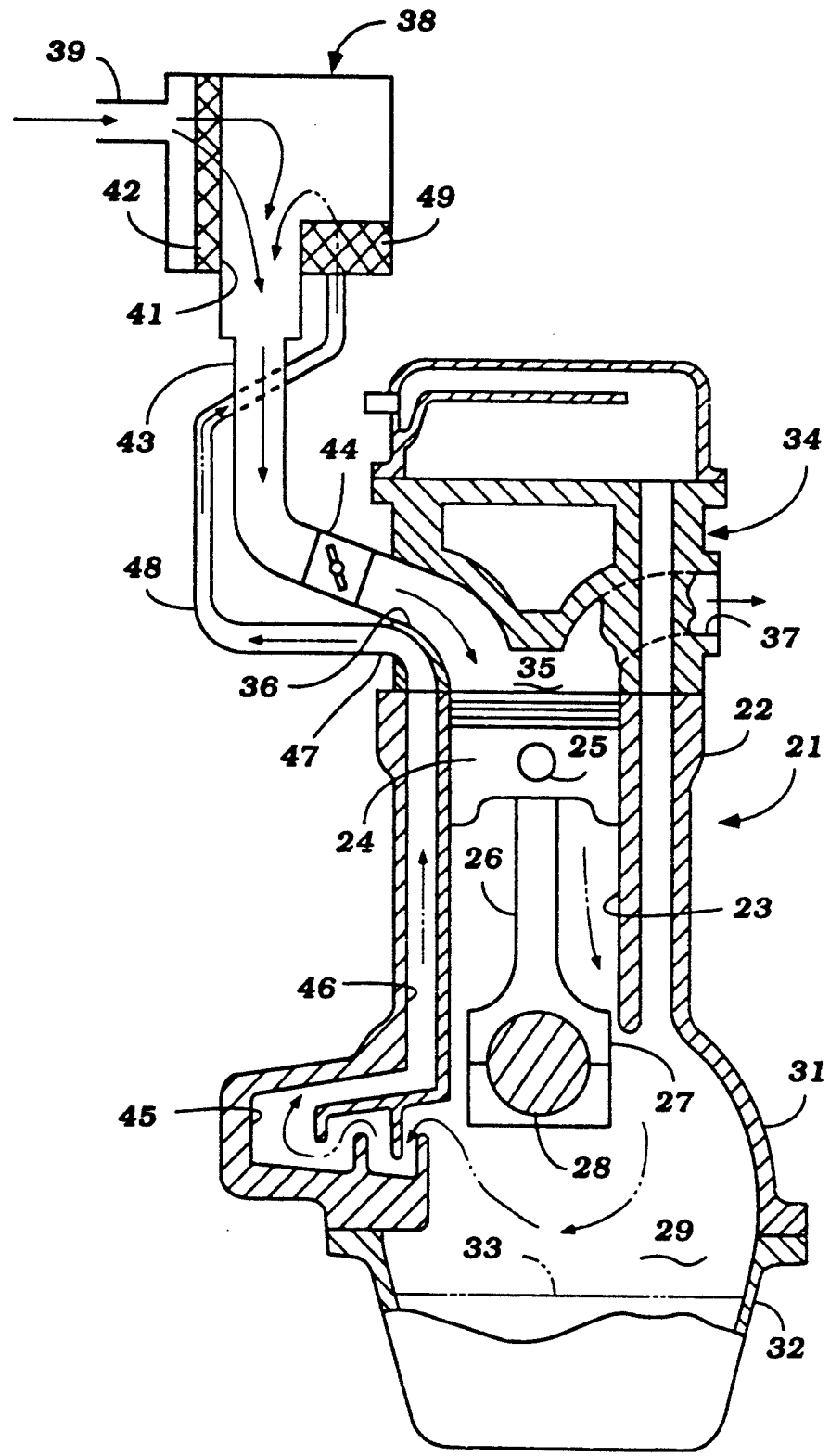
FIG. 1 is a cross sectional view taken through an internal combustion engine having a crankcase ventilating system of the prior art type.

In each of the embodiments described, the basic construction of the gas powered internal combustion engine 21 is the same as that described in conjunction with the prior art construction illustrated in FIG. 1 and only the crankcase ventilating system differs. For that reason, the basic components of the engine have been identified by the same reference numerals and the description of the basic engine will not be repeated. It should also be readily apparent that the invention may be utilized with a wide variety of types of internal combustion engines. However, the invention has particular utility in conjunction with an internal combustion engine powered by a gaseous fuel and employed to drive a compressor of a heat pump assembly, certain portions of which will be described in connection with certain of the illustrated embodiments.

Figure 2:
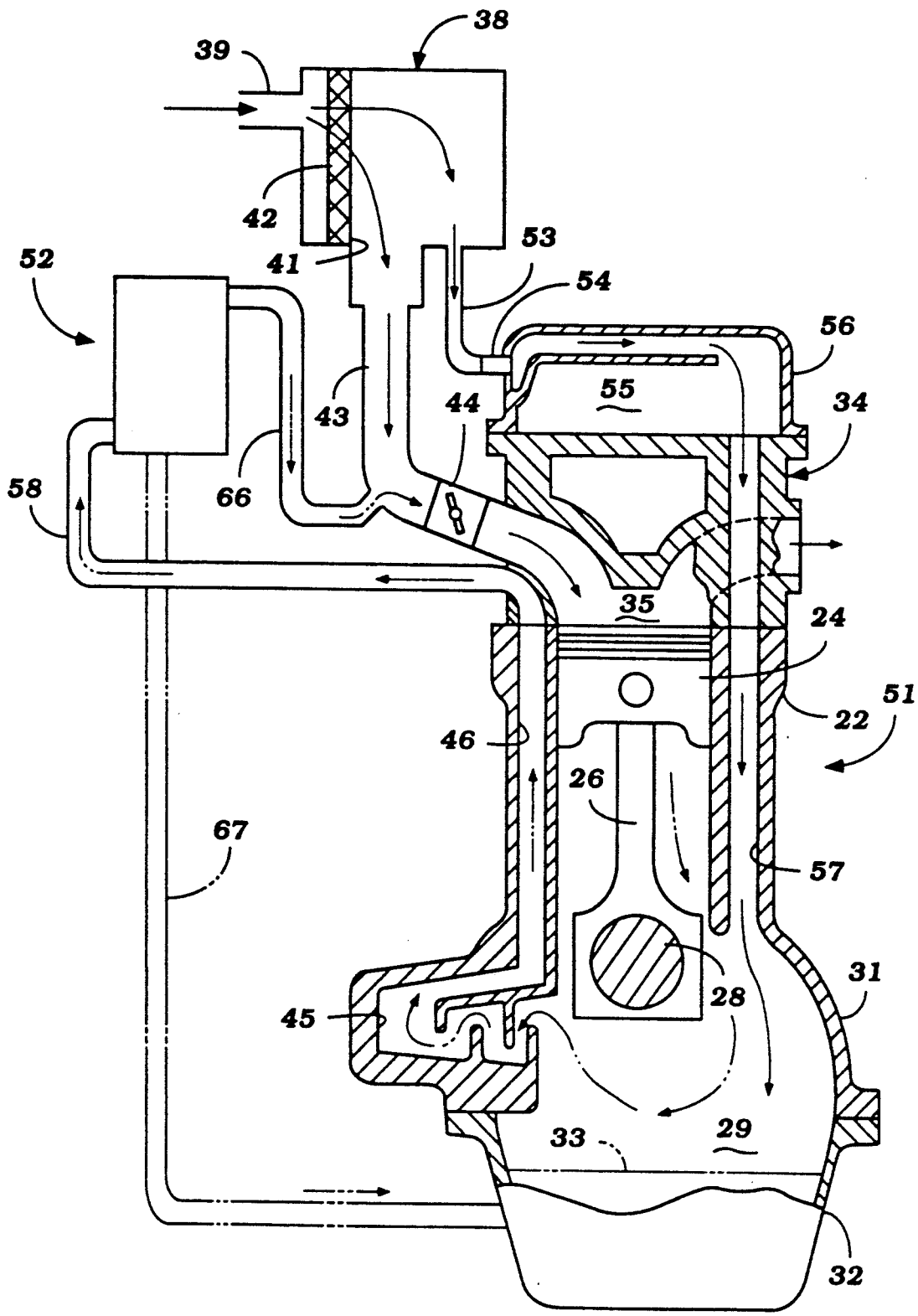
FIG. 2 is a cross sectional view taken through a gas fueled internal combustion engine for a heat pump air conditioner constructed in accordance with a first embodiment of the invention.
Figure 3:
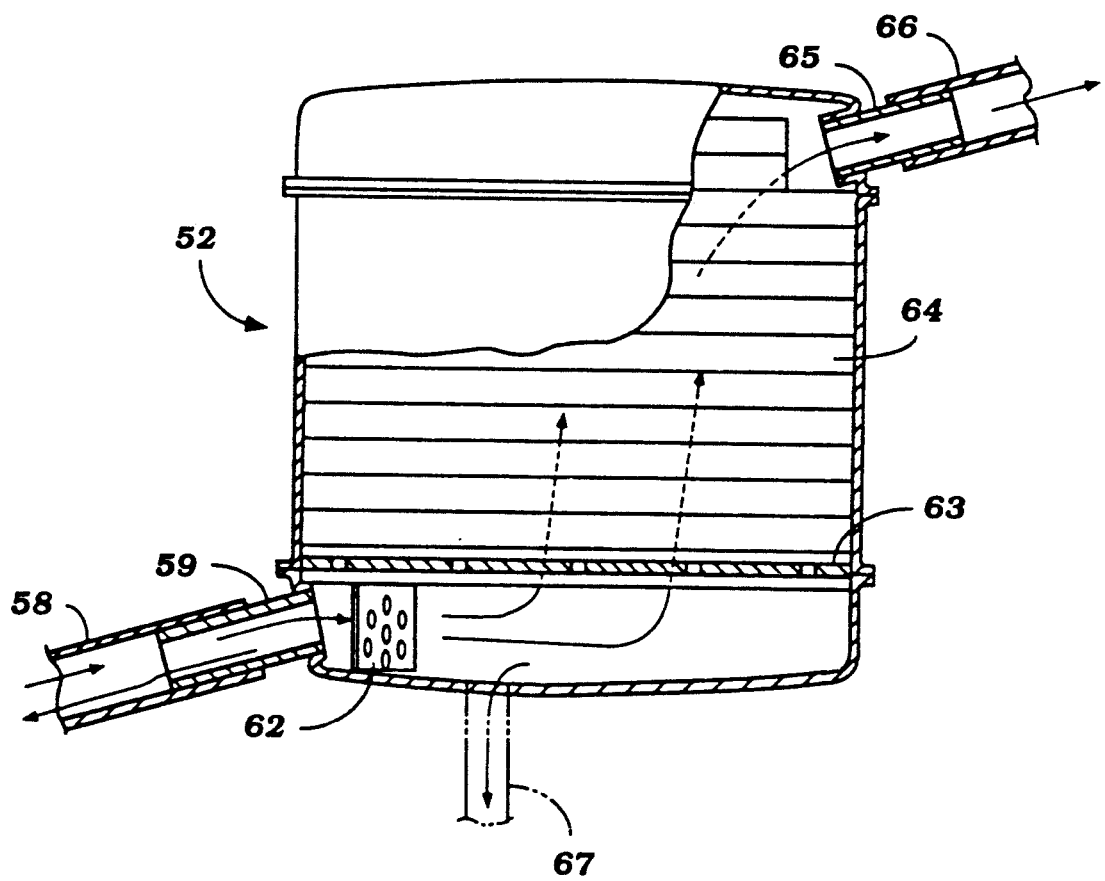
FIG. 3 is an enlarged cross sectional view of the oil vapor separator of this embodiment.

Turning first to the embodiment of FIGS. 2 and 3, a gas powered internal combustion engine constructed in accordance with this embodiment of the invention is identified generally by the reference numeral 51 and differs from the prior art type of construction primarily in the construction of its oil vapor separator, indicated generally by the reference numeral 52 and how this oil vapor separator receives crankcase gases from the engine 51 and recirculates them. Because of the similarity of the induction system to the prior art type of induction system, the components of this embodiment which are the same as the prior art construction have also been identified by the same reference numerals as employed in conjunction with the description of FIG. 1.

In this embodiment, a source of filtered atmospheric air for crankcase ventilation purposes is drawn from the air inlet device 38 downstream of the filter element 42 and discharged through a conduit 53. The conduit 53 communicates with a crankcase ventilating inlet nipple 54 formed in a valve chamber 55 formed in part by a cam cover 56 affixed to the cylinder head 34 in an appropriate manner. If desired, the inlet nipple 54 may be provided with a one way check valve so as to preclude reverse flow back through the conduit 53 to the air inlet device 58. The crankcase ventilating gases from the valve chamber 55 flow downwardly through a vertically extending passage 57 formed in the cylinder block 22 and flow across the crankcase chamber 29 for discharge through the separator 45 and passage 46.

A conduit 58 delivers these crankcase ventilation gases to the oil vapor separator 52 which has an internal construction as best shown in FIG. 3. The oil vapor separator 52 has an inlet fitting 59 that receives the crankcase gases from the conduit 58 for entry into an internal chamber 61 across which a vertically extending perforated baffle plate 63 is positioned. The baffle plate 62 will cause impingement of the gases on it and will tend to cause the oil particles or vapors in the crankcase gases to be condensed. However, since the separator 52 is provided within an outer housing (to be described) of the associated heat pump, the oil vapor separator 52 will be relatively heated and there will be no condensation of water vapor occur in the chamber 61.

The crankcase gases then flow upwardly through a further perforated baffle plate 63 that extends in a horizontal direction across the upper end of the chamber 61 so as to effect further condensation of the oil vapor while, at the same time, insuring against the condensation of any water vapor. The gases then flow through a filter element 64 which is effective to pass the gases and water vapor while further assisting in condensation of the oil vapor.

The crankcase ventilating gases from which the oil has been separated then pass through a discharge nozzle 65 to a flexible conduit 66 which returns the gases to the induction system and specifically the manifold portion 43 upstream of the throttle valve 44 but downstream of the air inlet device 38 so as to insure that any water vapor will not condense but will be returned back to the engine combustion chamber 35 for further refinement by the combustion therein.

The oil which has condensed in the oil separator 52 will flow downwardly into the chamber 61 and then can be discharged through a conduit 67 for return back to the crankcase chamber 29. In this way, it will be insured that the amount of lubricant in the crankcase chamber 29 will not be significantly depleted even during long periods of running but also it will be insured that no water vapor can condense and contaminate the lubricant.

Figure 4:
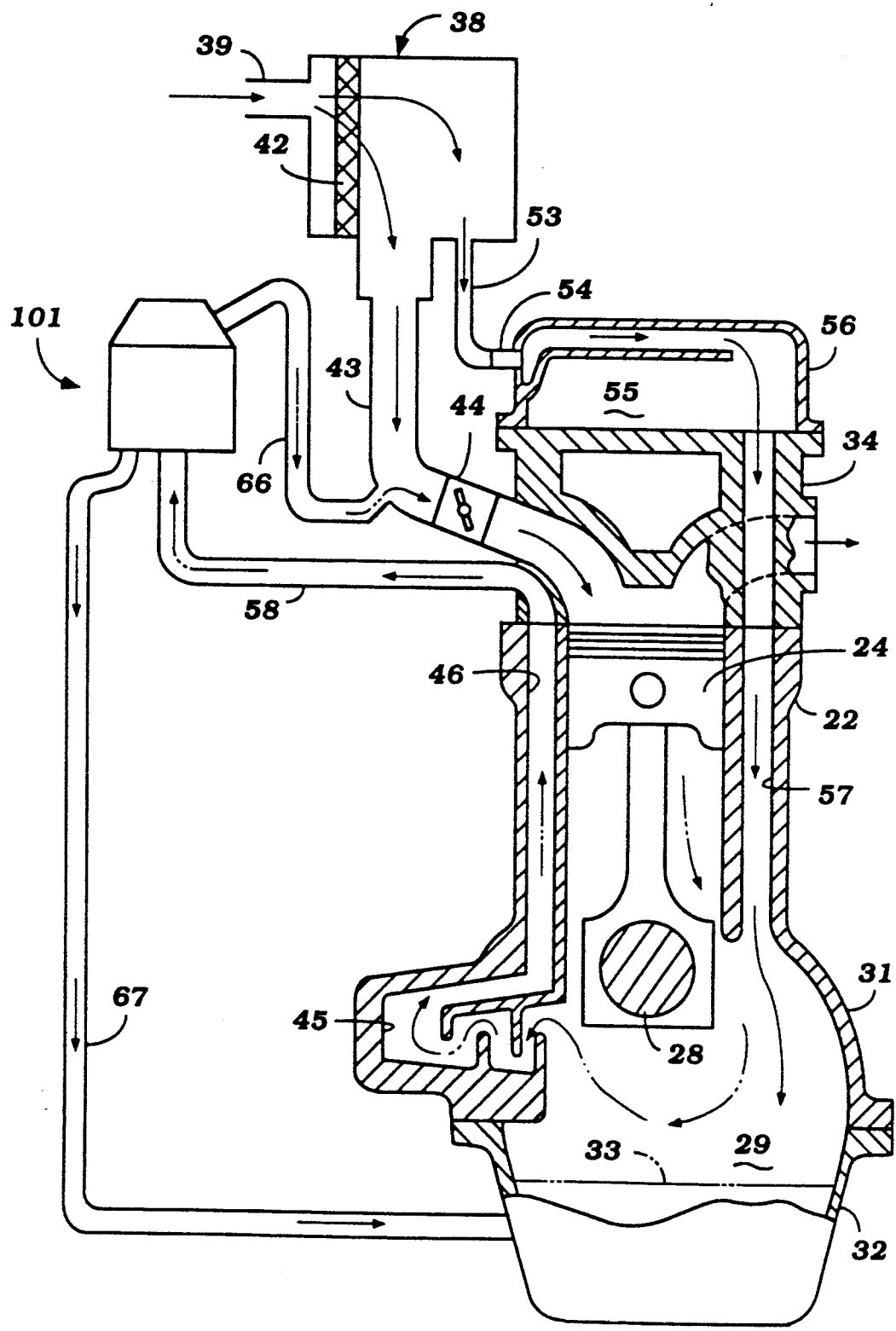
FIG. 4 is a cross sectional view, in part similar to FIG. 2, and shows another embodiment of the invention.
Figure 5:
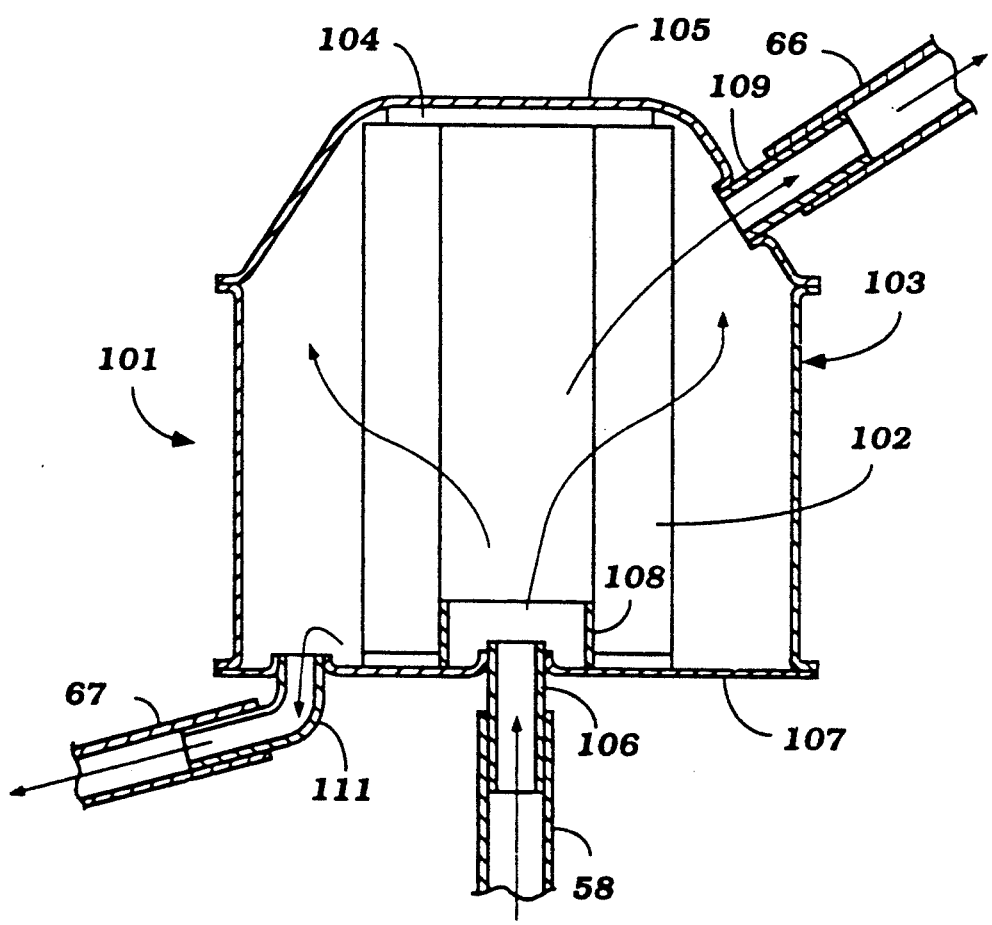
FIG. 5 is a cross sectional view through the oil vapor separator of this embodiment.

FIGS. 4 and 5 show a second embodiment of the invention which is the same as the embodiment of FIGS. 2 and 3 except for the construction of the oil vapor separator, which is indicated in this embodiment generally by the reference numeral 101 and which is shown in most detail in FIG. 5. Since the oil vapor separator 101 constitutes the only departure of the embodiment shown in FIGS. 2 and 3, components of this embodiment which are the same as that embodiment have been identified by the same reference numerals and will not be described again, except in so far as may be necessary to understand the construction and operation of this embodiment.

In the embodiment of FIGS. 2 and 3, the oil separator 52 and specifically the filter element 64 operated to remove the oil particles from the flowing crankcase ventilation gases by entrapment. In this embodiment, a filter element, indicated generally by the reference numeral 102 is provided in an outer casing 103 and through which the crankcase gases flow. The filter element 102 is of a wire mesh type and separates the oil particles from the flowing crankcase ventilation gases by its mesh size.

As may be seen in FIG. 5, the outer casing 103 is of generally canister type and the filter element 102 is cylindrical with an upper end plate 104 that is sealingly engaged with a top wall 105 of the outer housing 103. The conduit 58 communicates with an ventilating gas inlet pipe 106 that is centrally disposed in a lower plate 107 of the housing 103 and which is surrounded by an upstanding flange 108 which is sealingly engaged with the inner peripheral surface of the filter element 102. The crankcase gases therefore flow radially outwardly through the filter element 102 and are discharged back into the induction system through the conduit 66 by means of a discharge nipple 109 formed in the cover plate 105. An oil drain 111 is formed in the lower wall 107 radially outwardly of the filter element 102. The condensed oil separated by the filter element 102 will collect on the lower wall 107 and flow from the drain 111 back to the crankcase chamber 29 through the flexible conduit 67.

Figure 6:
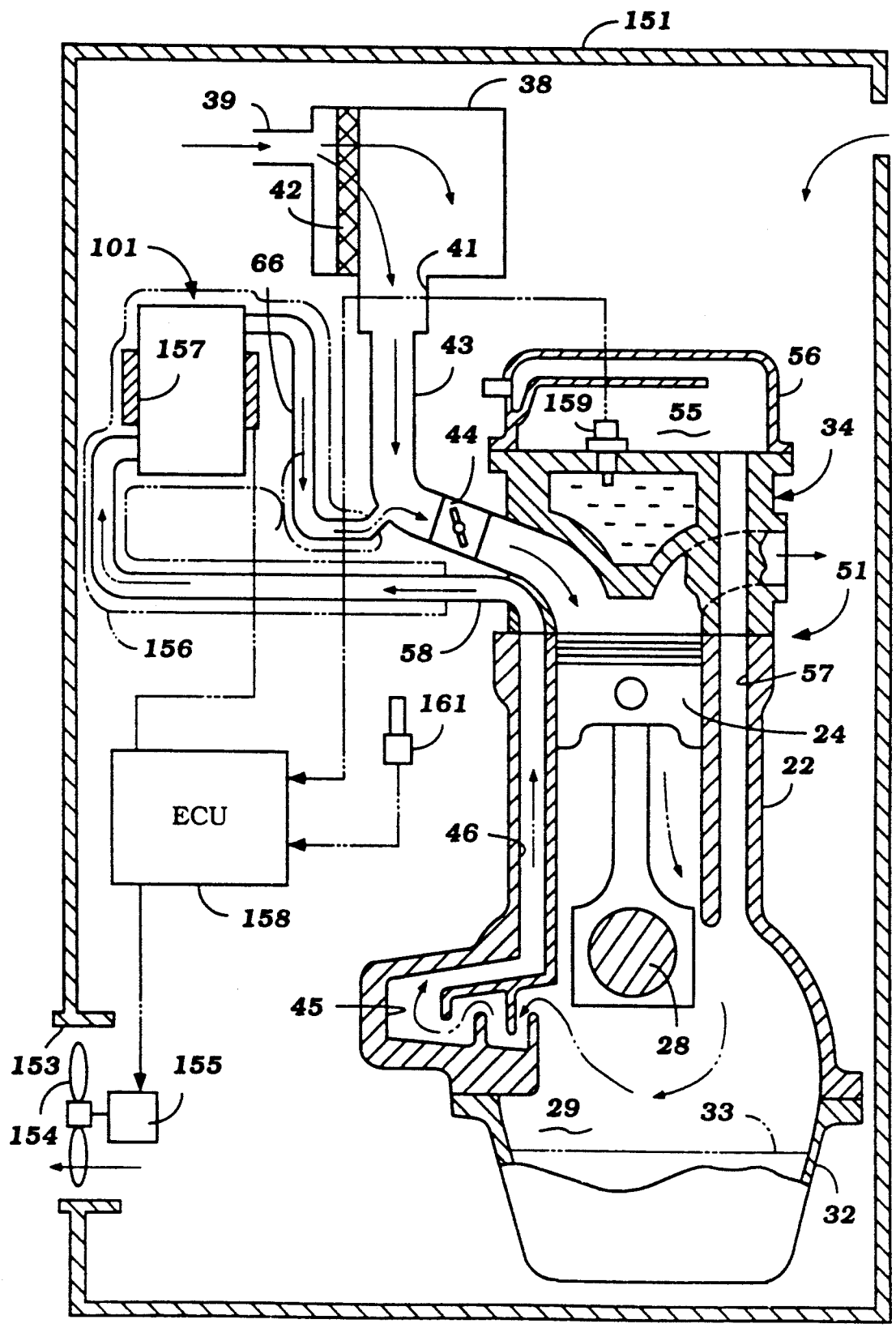
FIG. 6 is cross sectional view, in part similar to FIGS. 2 and 4, and shows yet a further embodiment of the invention and also illustrates further details of the surrounding structure.
Figure 7:
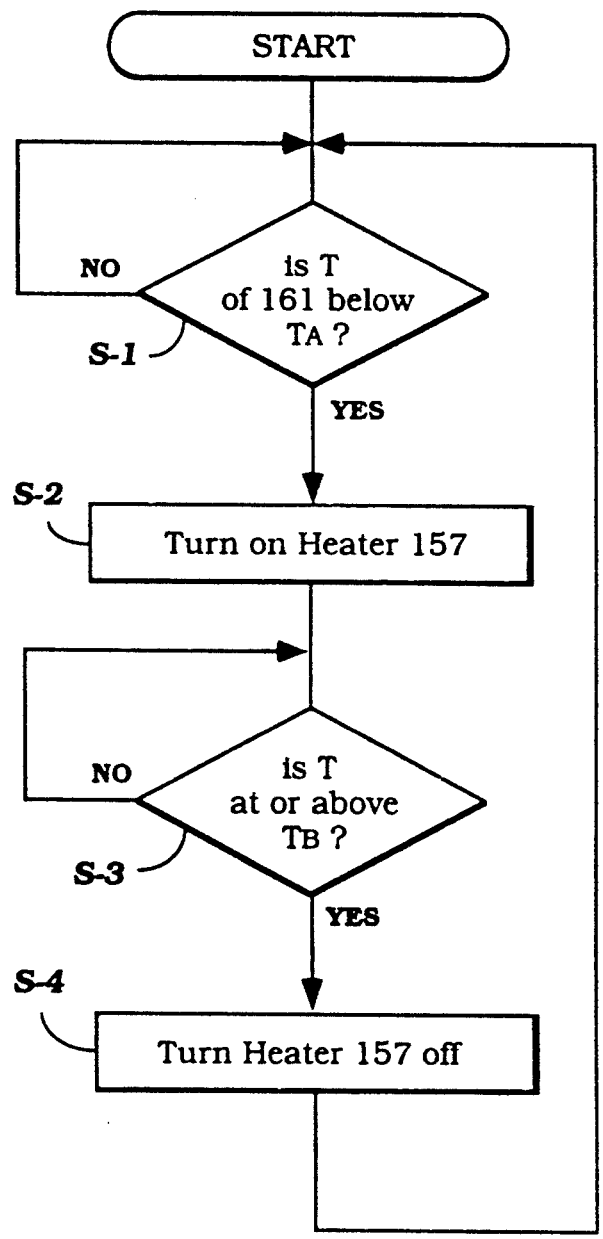
FIG. 7 is a block diagram showing the control routine for this embodiment.
Figure 8:
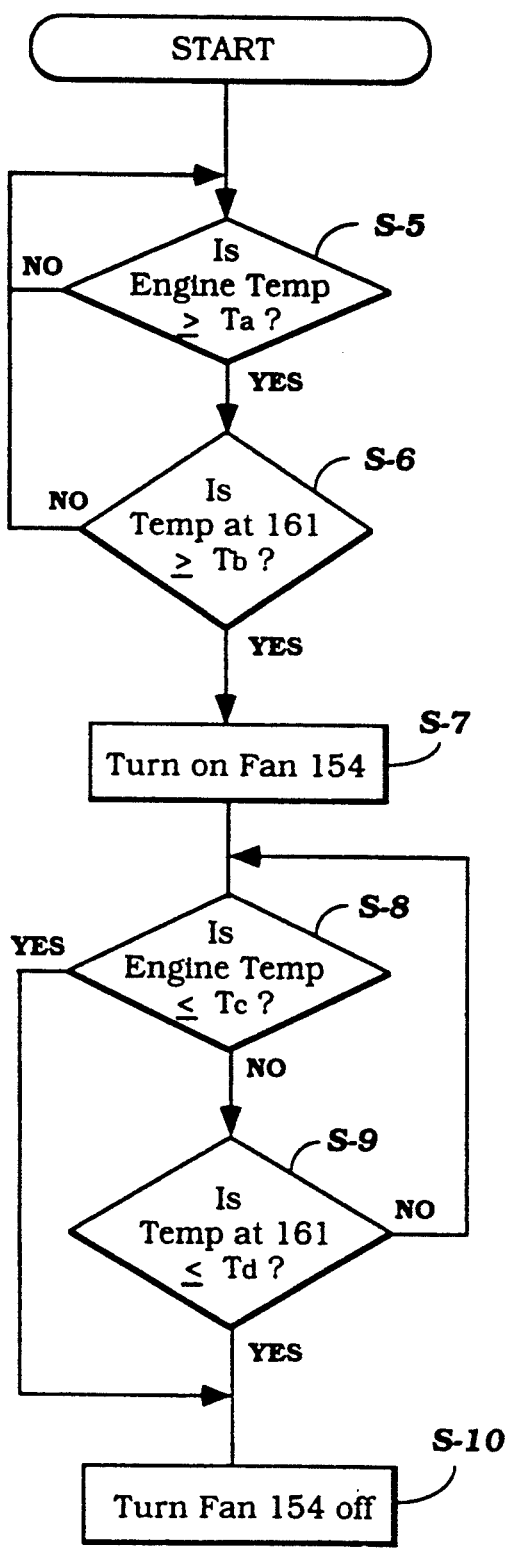
FIG. 8 is a block diagram showing a further phase of the control routine.

In the two embodiments of the invention as thus far described the crankcase ventilating gases have been supplied by an atmospheric air inlet which tends to keep the temperature in the crankcase chamber lower and also will tend to reduce the nitrous oxide emissions. However, there are some advantages to avoiding the introduction of outside air into the crankcase chamber 29 and specifically it may be desireable to provide a somewhat elevated temperature in the crankcase chamber so as to reduce the likelihood of condensation of water vapor in the crankcase chamber. In addition, it may be desirable to provide further heating for the oil separator to insure that the water vapor will not be condensed in it. As previously noted, the embodiments thus far described are positioned in an outer housing of a heat pump and thus receive some heat from the engine so as to avoid such condensation. FIGS. 6 through 8 show another embodiment of the invention wherein there is no external admission of ventilating air for the crankcase ventilation and wherein a heater element is provided for the oil, vapor separator. In addition, FIG. 6 shows further components of the heat pump, but it is to be understood that those components are also provided in the embodiments of FIGS. 2 and 3 and 4 and 5.

In this embodiment, the engine, indicated generally by the reference numeral 51, and oil separator 101 may be substantially the same as the embodiment of FIGS. 4 and 5 and, for that reason, these components have been identified by the same reference numerals and will not be described again. It is to be understood, however, that other forms of oil vapor separators may be employed in conjunction with this embodiment such as the type shown in FIGS. 2 and 3.

In this embodiment, the outer housing assembly of the heat pump with which the engine 51 is associated is identified generally by the reference numeral 151 and has an atmospheric air inlet 152 through which atmospheric air is drawn for cooling of the components and also for induction into the engine 51 for its combustion. A discharge opening 153 is formed in a lower wall of the outer housing 151 and a ventilating or cooling fan 154 is provided in conjunction with the outlet opening 153. The fan 154 is driven by an electrical motor 155, in a manner to be described, for drawing and circulating air through the outer housing 151 as shown by the solid line arrows in FIG. 6.

Also contained within the outer housing 151 are the other components of the heat pump such as a compressor (not shown) which is coupled to the engine crankshaft 28 to be driven thereby, and various other components as are normally associated with such gas heat pumps.

A heat duct, shown in phantom and identified generally by the reference numeral 156 encircles a portion of the conduit 58 that delivers the crankcase ventilating gases to the separator 101, the separator 101 and a portion of the conduit 66 that delivers the separated crankcase ventilating gases back to the induction system 43 upstream of the throttle valve 44. In addition, an electrical heating element, indicated generally by the reference numeral 157 encircles the oil vapor separator 101 for heating it under certain conditions, as will be described.

An electrical control unit 158, such as an ECU, is provided in the outer housing 151 and receives temperature signals from an engine cooling system temperature sensor 159 mounted in the cylinder head 34 and in communication with the cooling jacket thereof and a temperature sensor 161 positioned within the outer housing 151 so as to sense the temperature within the outer housing 151. The ECU 158 controls the operation of the fan motor 155 and the heating element 157. Basically, the system operates so as to provide electrical heat to the heater 157 when the temperature of the engine 51 is low and also when the temperature within the housing 151 is low. However, as the temperature of the engine raises and the temperature within the outer housing 151 raises, the ECU 158 will switch off the heater 157 to avoid overheating of the separator 101 and turn on the fan motor 155 to lower the temperature in the outer housing 151. In this way it will be insured that the engine 51 is adequately cooled and that the oil vapor separator 101 operates at a temperature so that water vapor will not condense but also so that any oil vapor will condense and not be vaporized and returned into the induction system of the engine and cause smoke in the exhaust.

The control routine may be best understood by reference to FIGS. 7 and 8 and will now be described initially by reference to FIG. 7. When the program of the ECU 158 starts it first moves to the Step S-1 to determine if the temperature within the outer housing 151 sensed by the sensor 161 is lower than a predetermined temperature $T_A$. If the temperature is not below the temperature $T_A$, the program merely repeats. If, however, the temperature in the housing 151 is below the temperature $T_A$ the program then moves to the Step S-2 so as to turn the heater 157 on so as to elevate the temperature of the oil separator 101 sufficiently so as to insure against any condensation of water vapor therein. This will insure against the condensation of water which could return to the crankcase chamber 29 and contaminate the lubricant therein.

The program then moves to the Step S-3 to determine if the temperature in the housing 151 is equal to or lower than a higher temperature $T_B$ which is greater than the temperature at which it is desired to heat the oil separator 101 to avoid oil vaporization and also at too high a temperature for the interior of the outer housing 151. If at the Step S-3 it is determined that the temperature sensed by the sensor 161 is below the temperature $T_B$, the program continues to repeat.

If, however, at the Step S-3 it is determined that the temperature in the outer housing 151 around the engine 51 and the heating duct 156 is above the temperature $T_B$ then the program moves to the Step S-4 so as to turn the heater 157 off since the temperature in the outer housing is then adequate to maintain the operation of the oil vapor separator without requiring additional heat from the heater 157. The program then repeats back to the Step S-1. In this way it will be insured that the temperature of the oil separator 101 will always be at a high enough temperature to insure that water in the crankcase ventilating gases will be maintained in a vaporous state and not condensed and also that it will not be vaporized but can be condensed.

The operation of the cooling fan 154 and its driving motor 155 is controlled by the routine shown in FIG. 8, which routine takes place simultaneously with the routine of FIG. 7. This operation will now be described by reference to FIG. 8.

After the program starts at the Step S-5, the temperature of the engine coolant is sensed by the sensor 159 to determine if it is equal to or higher than a predetermined temperature $T_a$. If the engine temperature is not equal to or above the temperature $T_a$, the program repeats. If, however, the engine temperature is above the temperature $T_a$ then the program moves to the Step-6 to sense the temperature in the outer housing 151 to determine if the engine exterior is at a temperature equal to or higher than a predetermined temperature $T_b$.

If at the Step S-6 it is determined that the temperatures of the engine are equal to or greater than the temperature $T_a$ and the interior of the outer housing 151 is above the temperature $T_b$, then the program moves to the Step S-7 to turn the ventilating fan motor 155 on. This is done so as to prevent the temperature of the engine 51 and the temperature in the interior of the housing 151 from becoming excessive which could not only cause possible damage to the engine 51 but also deteriorate the lubricant and also possibly heat the oil vapor separator 101 to a high enough temperature that the oil vapor would not be condensed therein but would pass as a vapor to the engine induction system 43.

After the fan 154 has been turned on at the Step S-7, the program moves to the Step S-8 to determine if the water temperature sensor 159 is equal to or lower than a set temperature $T_c$. If the engine temperature is below this temperature, the program jumps to the Step S-10 so as to turn the fan off 104 by discontinuing the source of electrical power to its driving motor 155.

If, however, at the Step S-8, it is determined that the temperature of the cooling system of the engine 51 is not equal to or lower than the temperature $T_c$, the program then moves to the Step S-9 to determine if the temperature in the outer housing 151 is equal to or lower than a further predetermined temperature $T_d$. If the temperature in the outer housing 151 is not below or equal to the temperature $T_d$, the program returns back to the Step S-8 and repeats. If, however, the temperature in the outer housing 151 is below the temperature $T_d$, then the ECU 158 turns off the fan motor 155. The program then repeats at the end of Step S-10 back to the start, as should be readily apparent.

For reference values the temperature $T_a$ is less than the temperature $T_c$ and the temperature $T_b$ is less than the temperature $T_d$. Thus, it should be clear that the system is effective to insure not only the temperature of the engine 51 is kept within desired ranges but also that the temperature of the oil separator 101 will be kept at the appropriate temperature to cause condensation of the oil vapor but not of the water vapor. In addition, this is done in such a way as to minimize the expenditure of electrical energy for operating the heater 157.

It should be noted that in this embodiment, the conduit 58 enters the oil separator 101 through its lower wall and hence the condensed oil can return back to the crankcase chamber through the ventilating gas delivery line. This is easily possible since the amount of oil condensed and returned is substantially less than the volume of ventilating air flow.

Figure 9:
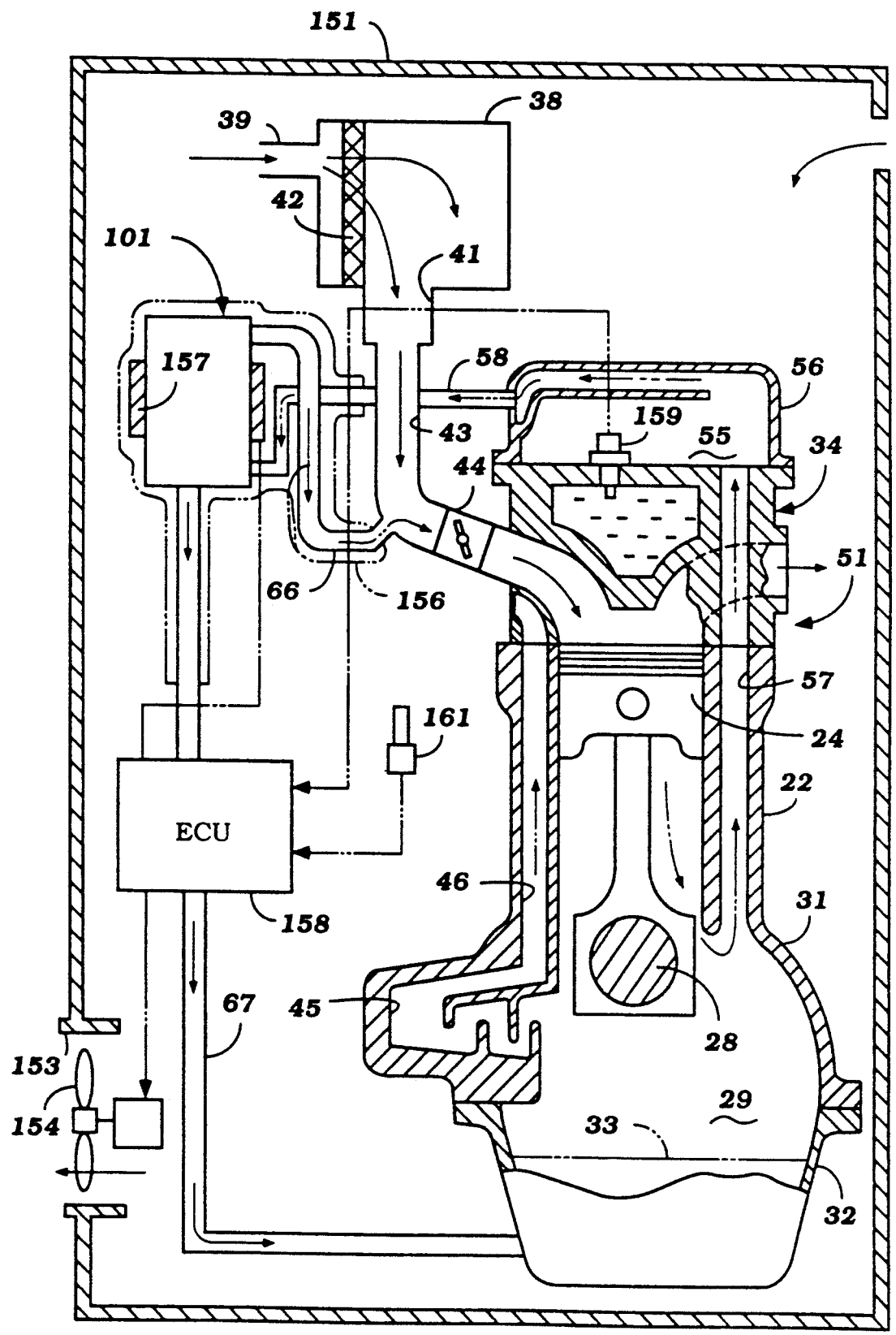
FIG. 9 is a cross sectional view, in part similar to FIGS. 2, 4 and 6 and shows yet another embodiment of this invention.

FIG. 9 is another embodiment of the invention which is substantially the same as the embodiment of FIGS. 6 through 8. The only difference is that in this embodiment the flow of crankcase ventilating gases is delivered to the oil vapor separator 101 from the cam chamber 55 rather than from the crankcase chamber 29. This provides a longer flow path for the ventilating gases and will reduce the amount of oil vapor and oil particles delivered to the separator 101. Since this is the only difference, all components of this embodiment have been identified by the same reference numerals and further description of this embodiment is believed to unnecessary for this reason. It should be noted, however, that this embodiment like the embodiments of FIGS. 2 and 4 has an oil return line 67 from the oil vapor separator 101 back to the crankcase chamber 29.

Figure 10:
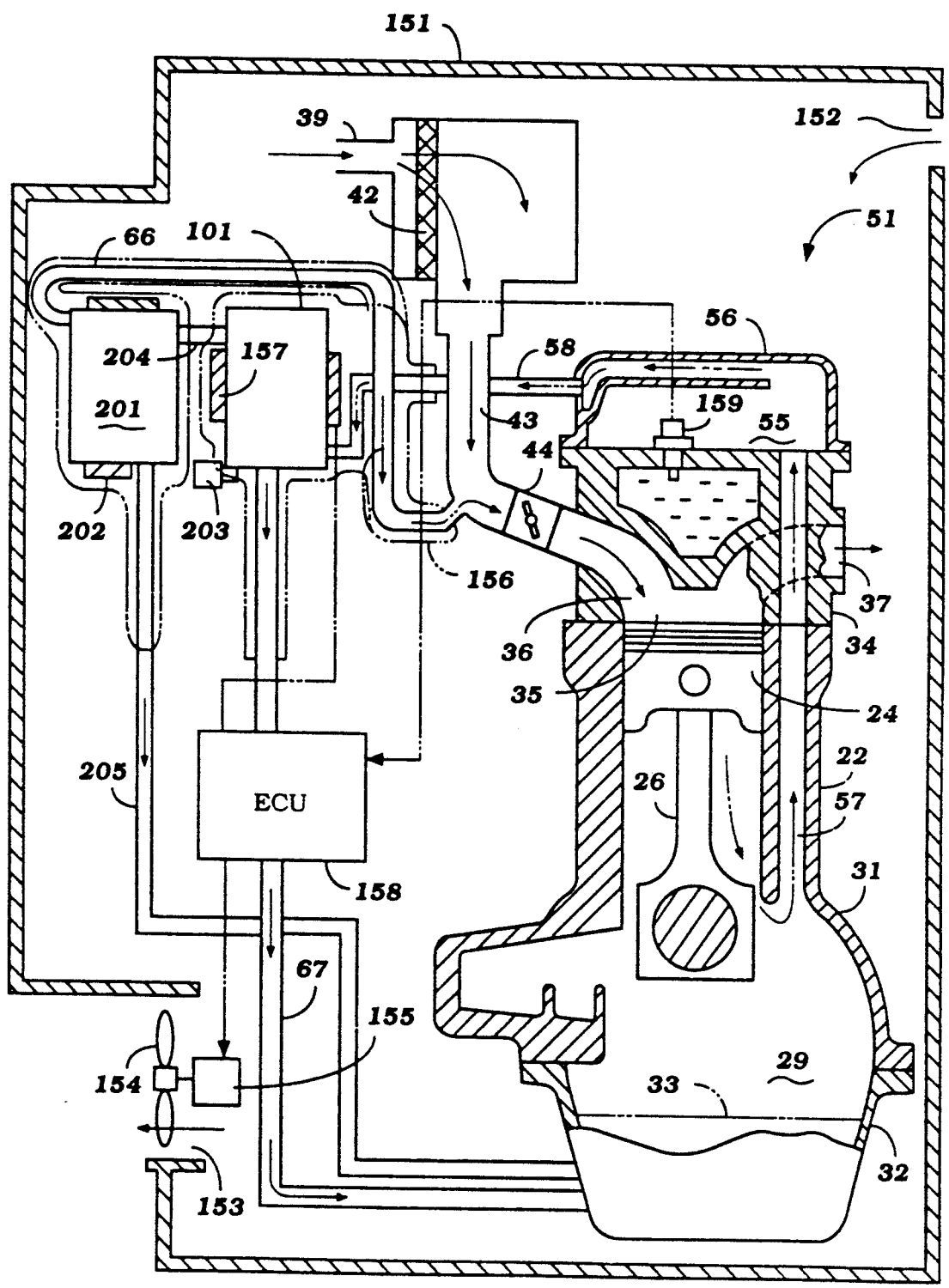
FIG. 10 is a cross sectional view, in part similar to FIGS. 2, 4, 6 and 9 and shows yet a further embodiment of this invention.
Figure 11:
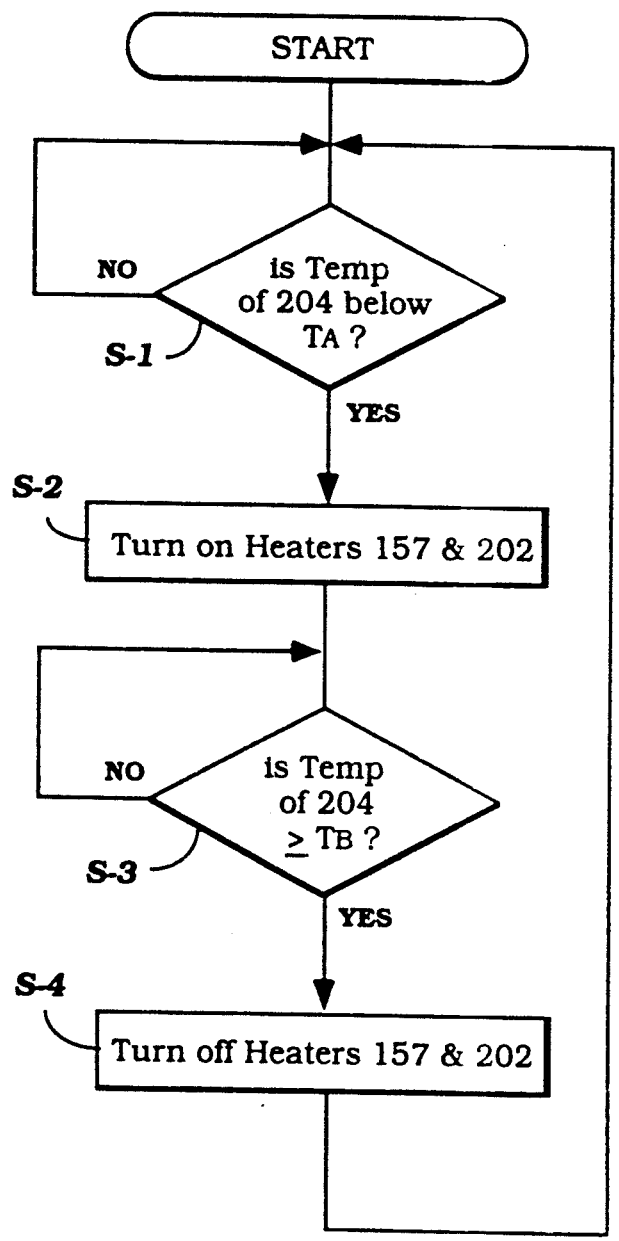
FIG. 11 is a block diagram showing a portion of the control routine of this embodiment.
Figure 12:
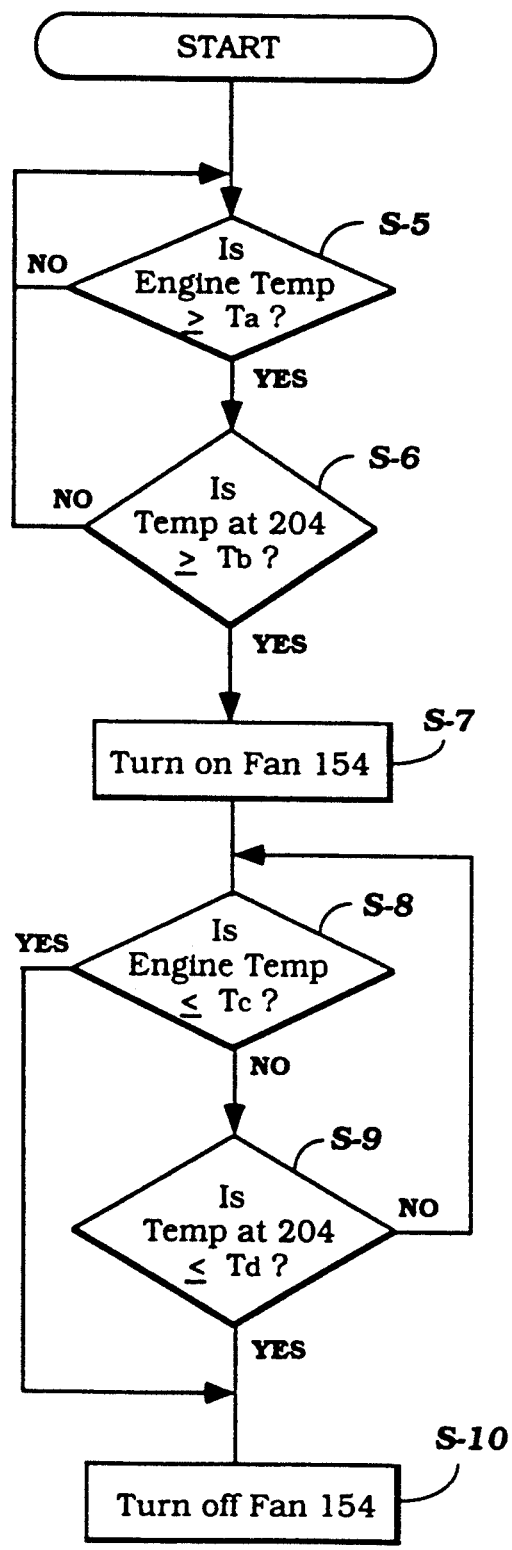
FIG. 12 is a block diagram showing another portion of the control routine of this embodiment.

FIGS. 10 through 12 show another embodiment of the invention which is generally similar to the embodiment of FIGS. 6 through 8 in construction and operation. However, this embodiment employs a second oil vapor separator, indicated generally by the reference numeral 201 having its own electrical heating element 202 and which operates in series with the oil vapor separator 101. In this embodiment rather than sensing the temperature within the outer housing 151, a temperature sensor 203 is provided which senses the temperature of the oil vapor separator 101 so as to provide a further and more accurate control for the various temperature control devices.

As may be seen in FIG. 10, a discharge conduit 204 extends from the oil vapor separator 101 to the oil vapor separator 201 rather than to the induction system 43. A discharge conduit 66, however, extends from the second oil vapor separator 201 to the induction system 43 upstream of the throttle valve 44. In addition, the insulating housing 156 encircles both of the oil vapor separators 101 and 201. Furthermore, a return conduit 205 extends from the oil vapor separator 201 back to the crankcase chamber 29 in parallel flow relationship to the return conduit 67 from the oil vapor separator 101.

The control routine for this embodiment is shown in FIGS. 11 and 12 with 11 showing the control for the heaters 157 and 202 and FIG. 12 showing the control for the fan motor 155. Referring first to FIG. 11, when the program starts it moves first to the Step S-1 to determine if the temperature of the oil vapor separator 101 as sensed by the sensor 203 is above a predetermined temperature $T_A$. If it is not, the program repeats. If, however, it is determined at the Step S-1 that the temperature of the first oil vapor separator 201 is below the temperature $T_A$, then the program moves to the Step S-2 to turn where the ECU 158 turns on the heaters 157 and 202.

The program then moves to the Step S-3 to determine if the temperature of the first oil separator 201 is above or equal to a higher temperature $T_B$. If it is not, the program then repeats back to the Step S-3. If, however, at the Step S-3 it is determined that the temperature of the oil separator 101 is equal to or above the temperature $T_B$ then the heaters 157 and 202 are turned off, for the reasons aforedescribed.

Now to FIG. 12, the control for the fan 154 and its motor 155 starts and moves to the Step S-6 to sense whether the water temperature of the engine 51 as sensed by the sensor 159 is equal to or above the predetermined temperature $T_a$. If it is not, the program repeats.

If, however, the temperature of the engine is equal to or above the temperature $T_a$ then the program moves to the Step S-7 to determine if the temperature of the oil separator 101 as sensed by the sensor 203 is equal to or above a predetermined temperature $T_b$. If it is not, the program repeats back to the Step S-6.

If, however, at the Step S-7 it has been determined that the temperature of the engine is equal to or greater than the predetermined temperature $T_a$ and the oil separator 101 as sensed by the sensor 203 is equal to or above the temperature $T_b$ then the program moves to the Step S-7 so as to turn on the fan 154 by energizing the motor 155.

When the fan 154 has been turned on the program then moves to the Step S-8 to determine if the engine temperature is equal to or below a temperature $T_c$. If it is, the program jumps to the Step S-10 to turn off the fan 154.

If, however, the engine temperature is not equal to or less than the temperature $T_c$ the program moves to the Step S-9 to determine if the oil separator 101 is equal to or less than the temperature $T_d$. If it is not, the program repeats back to the Step S-8. If, however, it is then the program moves to the Step S-10 so as to turn off the fan 154. The reasons for the temperature controls in this embodiment are the same as those of the embodiment of FIGS. 6 through 8 and for that reason it is not believed to be necessary to repeat these reasons.

It should be readily apparent from the foregoing description that the described embodiments of the invention provide a very effective way of separating water vapor from oil in a crankcase ventilating system for the gas powered engine of a heat pump so as to insure extremely long life and long service intervals. Of course, the described embodiments are merely preferred embodiments of the invention and various changes and modifications may be made without departing from the spirit and scope of the invention, as defined by the appended claims.

What is claimed:

1. An internal combustion engine having a crankcase and crankcase ventilating system and contained within a housing having an air inlet and an air discharge through which cooling air is circulated, an oil vapor separator contained within said housing, conduit means for delivering gases from said crankcase ventilating system to said oil vapor separator, return conduit means for returning condensed oil from said oil vapor separator to said crankcase, ventilating discharge means for discharging ventilating gases from said oil vapor separator to said engine for combustion in a combustion chamber thereof, said oil vapor separator being positioned within the housing in such a manner that heat transferred from said engine to the interior of said housing will heat said oil vapor separator, and means for controlling the temperature within the housing to maintain sufficient heat in said oil vapor separator to vaporize water vapor for separation from lubricant and to prevent overheating of said engine.

2. An internal combustion engine as set forth in claim 1 wherein the temperature within the housing is controlled by sensing the temperature in the housing and causing a circulating air flow through the housing to control the temperature.

3. An internal combustion engine as set forth in claim 1 wherein the temperature within the housing is controlled by controlling the temperature of the engine.

4. An internal combustion engine as set forth in claim 3 wherein the temperature is controlled by further sensing the temperature within the housing and cooling the housing by circulating air flow through the housing.

5. An internal combustion engine as set forth in claim 1 further including an electrical heater for heating the oil vapor separator.

6. An internal combustion engine as set forth in claim 5 further including means for controlling the temperature of the oil vapor separator by controlling the operation of the electrical heater to maintain the temperature above a predetermined minimum value and below a predetermined maximum value so as to promote vaporization of water and condensation of oil within the oil vapor separator.

* * * * *